United States Patent [19]

Blizzard et al.

[11] Patent Number: 5,049,616

[45] Date of Patent: Sep. 17, 1991

[54] METHOD FOR FORMING A CROSSLINKABLE PRESSURE-SENSITIVE ADHESIVE CONSTRUCTION CONTAINING A DIORGANOPOLYSILOXANE AND AN ACYLOXYSILANE

[75] Inventors: John D. Blizzard; Terence J. Swihart, both of Bay County, Mich.

[73] Assignee: Dow Corning Corporation, Midland, Mich.

[21] Appl. No.: 687,344

[22] Filed: Apr. 18, 1991

Related U.S. Application Data

[63] Continuation of Ser. No. 309,749, Feb. 13, 1989, abandoned.

[51] Int. Cl.$^5$ .................. C08L 83/06; C08L 7/00; C08F 8/00
[52] U.S. Cl. .................... 525/100; 525/101; 525/102; 525/104; 525/105; 525/106; 525/452; 525/477
[58] Field of Search ............... 525/100, 101, 102, 104, 525/105, 106, 452, 477

[56] References Cited

U.S. PATENT DOCUMENTS

| | | | |
|---|---|---|---|
| 4,623,693 | 11/1986 | Inoue | 524/700 |
| 4,665,127 | 5/1987 | Hirose | 525/100 |
| 4,693,935 | 9/1987 | Mazurek | 428/352 |

FOREIGN PATENT DOCUMENTS

WO87/03477  6/1987  PCT Int'l Appl. .

*Primary Examiner*—Joseph L. Schofer
*Assistant Examiner*—R. H. Delmendo
*Attorney, Agent, or Firm*—Alexander Weitz

[57] ABSTRACT

The invention relates to a method of contacting two components to form a pressure-sensitive adhesive (PSA) construction, wherein the first component comprises a conventional PSA and a hydroxy-functional diorganopolysiloxane and the second component comprises the same PSA and an acyloxysilane. The method provides improved adhesive bond strength over an unmodified PSA construction.

9 Claims, No Drawings

METHOD FOR FORMING A CROSSLINKABLE PRESSURE-SENSITIVE ADHESIVE CONSTRUCTION CONTAINING A DIORGANOPOLYSILOXANE AND AN ACYLOXYSILANE

This is a continuation of copending application Ser. No. 07/309,749 filed on 2/13/89, abandoned.

The present invention relates to crosslinkable pressure-sensitive adhesives and an improved method for forming a pressure-sensitive adhesive construction. More particularly, the present invention relates to a method of contacting two distinct pressure-sensitive adhesive components to form the construction, wherein a diorganopolysiloxane is incorporated in the first component and an acyloxysilane is incorporated in the second component.

BACKGROUND OF THE INVENTION

It is well known in the adhesives art that significant improvement in adhesion to various substrates can be obtained by incorporating various adhesion promoters into adhesive compositions or employing such adhesion promoters in primer compositions for coating the substrate. Development of a wide-ranging adhesives art has benefited from this method of adhesion improvement and various organosilanes have been typically employed as the adhesion promoter.

Organosilanes which are useful in these applications generally contain hydrolyzable groups (e.g., halogen, alkoxy) attached to the silicon atom thereof which generate silanol groups upon contact with ambient moisture, and thus readily form chemical and/or physical bonds with mineral and metal surfaces. Also attached to the silicon of the organosilane adhesion promoter is an organic moiety which is reactive with, or at least shows some affinity towards, one of the components of the adhesive (usually the polymer). This latter requirement usually limits the practical utility of a specific organosilane to particular adhesive-substrate combinations. In this way, a chemical or physical "molecular bridge" is believed to be formed between the adhesive and the substrate which results in the observed macroscopic improvement in adhesion.

Thus, for example, U.S. Pat. No. 3,644,245 to Flanagan et al. discloses hot melt adhesive compositions having improved adhesion under conditions of high humidity. These compositions comprise a synthetic polymer base and hydrolyzable silanes containing such organic groups as phenyl, vinyl, epoxy, mercapto, amino, ethyl, methyl and methacryloxypropyl.

Additionally, the adhesion to a substrate, as well as the cohesive strength of an adhesive composition, may be augmented by at least partially cross-linking the adhesive. Various examples of this method exist in the art, which method is illustrated by U.S. Pat. No. 3,657,379 to Hilbelink et al. This disclosure teaches adhesive systems comprising separated reactive components wherein (1) a first reactive polymer is mixed with a curing agent for a second reactive polymer to yield one component and (2) a second reactive polymer is mixed with a curing agent for the first reactive polymer to form another component. When the reactive materials from the two components are mixed, the curing agents react with their respective reactive polymers to give strong adhesive bonds.

A distinct category of adhesives which comprises natural or synthetic rubbers and resin tackifiers is known in the art as "pressure-sensitive adhesives" (PSAs). PSAs uniquely maintain a permanent "tack" which provides a bond of measurable strength immediately upon contact with another surface. Again, adhesion to a substrate, as well as the cohesive strength of the PSA composition itself, can be improved by curing the PSA.

A cured PSA based on a polyether having at least one silicon-containing hydrolyzable group in its molecule is disclosed by Hirose et al. in U.S. Pat. No. 4,463,115. This composition also contains a tackifier and, optionally, a silanol condensation catalyst for accelerating the curing reaction. It is stated that the resulting PSA has good adhesive properties and can be prepared substantially without the use of a solvent.

In a subsequent U.S. Pat. No. 4,665,127, Hirose et al. extended the above concept to include a wide variety of polymers having at least one reactive silicon-containing group combined with an organic aluminum or organic zirconium catalyst. These PSA compositions are said to have excellent heat resistance and releasability from substrates such as a silicone-coated release paper.

In U.S. Pat. No. 3,707,518, Bemmels et al. disclose a self cross-linking pressure-sensitive acrylate adhesive and tape which comprises a copolymer that includes a small amount of an alkoxy silyl polymerizable crosslinking monomer. Also included in these compositions is 2-6 parts by weight of an acid monomer which acts as a built-in catalyst and causes the adhesive copolymer to cure at ordinary temperatures.

Aside from silicone-based PSAs, the use of silanes as adhesion promoters or compositions wherein reactive silicon groups are chemically attached to organic molecules to promote cure therebetween, silicones are generally known in the art to be abhesive materials (i.e., they impart good release of adhesives) and have, indeed, been widely employed in release liners for pressure-sensitive tape. Surprisingly, as disclosed in four copending applications Ser. No. 181,763, filed on Apr. 14, 1988; Ser. No. 189,004, filed on May 2, 1988, now U.S. Pat. No. 4,831,080; Ser. No. 216,609, filed on July 8, 1988, now U.S. Pat. No. 4,906,695, and Ser. No. 303,783, filed on Jan. 30, 1989, abandoned), Blizzard and Swihart discovered a method for contacting two components to form a pressure-sensitive adhesive (PSA) construction, wherein the first component comprises a conventional PSA and a reactive organopolysilicon compound and the second component comprises the PSA and another reactive material which interacts with the organosilicon compound. The method provides improved adhesion, which generally increases with the passage of time, over the unmodified PSA.

SUMMARY OF THE INVENTION

It has now been further discovered that certain diorganopolysiloxanes and acyloxysilanes may also be employed according to the methods described by Blizzard and Swihart, cited supra. The present invention, therefore, relates to a method for forming a crosslinkable pressure-sensitive adhesive construction comprising contacting a first component comprising (I) a pressure-sensitive adhesive; and
(II) a diorganopolysiloxane fluid having at least two hydroxyl groups per molecule attached to the silicon atoms thereof, with a second component comprising (III) said pressure-sensitive adhesive; and
(IV) an acyloxysilane having the average formula

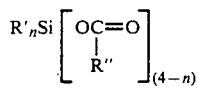

wherein R' is a monovalent hydrocarbyl group selected from the group consisting of a phenyl group and alkyl radicals having 1 to 6 carbon atoms, R" is an alkyl radical having 1 to 7 carbon atoms and n is 1 to 3.

This invention further relates to compositions comprising the pressure-sensitive adhesive and the diorganopolysiloxane (II), and to compositions comprising the pressure-sensitive adhesive and the acyloxysilane (IV), employed in the above described method.

DETAILED DESCRIPTION OF THE INVENTION

In the method of the present invention, a first component comprising (I) a pressure-sensitive adhesive (PSA) and (II) a diorganopolysiloxane having hydroxyl functionality is contacted with a second component comprising (III) the same pressure-sensitive adhesive and (IV) an acyloxysilane to form a PSA construction. While not wishing to be bound by any particular mechanism, it is believed that after the PSA construction is formed, the diorganopolysiloxane and the acyloxysilane interact to provide a "permanent set" to the adhesive system. Permanent set, as used herein, refers to the irreversible increase with time of the adhesive bond between the first and second components. This interaction can, of course, be hastened at elevated temperatures. The individual components, however, may generally be stored for prolonged periods under ambient conditions as long as they are not in contact with each other.

As far as is known, the exact nature of the pressure-sensitive adhesive (I) employed in the method and composition of the present invention is not critical to operability. The only limitation to this general operability is that the PSA have a reasonable degree of compatibility with the diorganopolysiloxane (II) and the acyloxysilane (IV), each described infra. By compatibility it is meant that the PSA components are not subject to phase separation upon standing and remain as homogeneous dispersions or solutions. Thus, it is believed that any of the PSAs known in the art will function satisfactorily herein. These PSAs are based on a natural or synthetic rubber which has been mixed with a tackifier resin and, optionally, with various fillers, plasticizers, extender oils, catalysts, preservatives, antioxidants, stabilizers, or other ingredient normally employed in the preparation of PSAs. The PSAs suitable for use in the methods and compositions of the present invention may be based on natural rubber and/or one or more synthetic rubber such as butyl, silicone, acrylic, styrene-butadiene, acrylonitrile-butadiene, polyisobutylene, isoprene, isoprene-isobutylene, chloroprene, polyvinylether, chlorinated and polyurethane rubbers, and the like. Typical resin tackifiers used in conjunction with these rubbers include rosin, hydrocarbon resins, terpene resin, siloxane resin and the like. Particularly preferred PSAs include those based on styrene-butadiene and acrylic polymers.

The pressure-sensitive adhesives of ingredient (I) are well known in the art and further description thereof is considered unnecessary. Many of these materials are available commercially.

Ingredient (II) of the present invention is a linear or branched diorganopolysiloxane fluid having at least two hydroxyl groups per molecule attached to the silicon atoms thereof. These fluids may be homopolymers based on only one organic group or they may be copolymers containing mixed organic groups in their chains. Although described as a diorganopolysiloxane, ingredient (II) may have up to about 10 mole percent of monoorganosiloxane units copolymerized with the diorganosiloxane units to still be within the scope of the present invention. Such materials have diorganopolysiloxane grafts along the main polymer chain.

The organic group of the diorganopolysiloxane may be a monovalent hydrocarbyl group such as an alkyl radical, such as methyl, ethyl, isopropyl, butyl and hexyl; an alkenyl radical, such as vinyl and allyl; an aryl radical, such as phenyl, tolyl and xylyl; an arylalkyl radical, such as beta-phenylethyl and beta-phenylpropyl; and a cycloaliphatic radical, such as cyclopentyl, and cyclohexyl. Alternatively, the organic group may be a monovalent halogenated hydrocabyl group of the above mentioned types. The end groups of the diorganopolysiloxane (II) are ordinarily hydroxyl groups, but may be selected from any of the above mentioned organic moieties as well.

Preferably, the diorganopolysiloxane is a linear polymer having the average formula

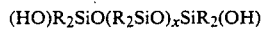

wherein R is the above defined organic group and x is 2 to about 5,000. In the above formula, it is further preferred that R is selected from the group consisting of methyl, phenyl and trifluoropropyl radicals, preferably methyl, and x is between 2 and 500.

Diorganopolysiloxane which are suitable for use as component (II) are well known in the art and many of these fluids or gums are available commercially. Therefore, further description of methods for the preparation of such materials is not detailed herein.

Ingredient (III) of the present invention is a further portion of the same PSA as ingredient (I).

The acyloxysilane (IV) may be represented by the average formula

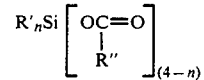

wherein R' is a monovalent hydrocarbyl group selected from the group consisting of a phenyl group and alkyl radicals having 1 to 6 carbon atoms, R" is an alkyl radical 1 to 7 carbon atoms and n is 1 to 3. For the purposes of the present invention, it is preferred that R' is selected from the group consisting of phenyl, methyl and ethyl radicals, R" is a methyl radical and n is 1.

The acyloxysilanes of the present invention are well known in the art and further description thereof is not considered necessary.

Although the above described diorganopolysiloxane and acyloxysilane may generally be employed in the method of the present invention, it has been found that certain reactive PSAs are themselves incompatible with some of these compounds. The skilled artisan will readily determine which of these compounds are compatible with a given PSA.

The compositions of this invention can further comprise typical adjuvants employed in the preparation of pressure sensitive adhesives, such as catalysts, fillers, pigments, dyes, fungicides, bacteriocides, stabilizers, antioxidants and curecontrol additives, if desired.

In order to practice the present invention, the first component of this invention is prepared by thoroughly mixing the diorganopolysiloxane (II) with the PSA (I) such that the diorganopolysiloxane (II) constitutes from about 0.5 to 20 percent of the total weight of (I) plus (II), on a solids basis. Preferably, the diorganopolysiloxane (II) constitutes from 1 to 10 percent by weight of (I) plus (II).

In a similar manner, the second component of this invention is prepared by thoroughly mixing a curing amount of the acyloxysilane (IV) with the PSA (III). By "curing amount" it is meant at least an amount sufficient to improve the adhesion between the two components as demonstrated by an increase in bond strength and/or increased cohesive failure versus the unmodified PSA. Thus, the amount of acyloxysilane employed will vary according to the nature of the PSA, amount of the diorganopolysiloxane incorporated therein and the particular acyloxysilane selected. Typically, this will vary from about 0.05 to about 10 percent by weight of the acyloxysilane based on the total weight of the acyloxysilane plus the PSA (III), on a solids basis.

The compositions of the present invention, in which the diorganopolysiloxane (II) is incorporated in a PSA (I), and in which the acyloxysilane (IV) is incorporated in a PSA (III), are thus employed as intermediates in the method of the present invention.

Those skilled in the art will readily arrive at optimum formulations by routine experimentation. For example, when the PSA is selected from the preferred systems based on acrylic or styrene-butadiene rubber, from about 1 to 10 percent by weight of the preferred hydroxyl terminated dimethylpolysiloxanes, having a degree of polymerization of 2 to 500, are effectively employed in the first PSA component and from about 0.1 to 5 percent by weight of phenyltriacetoxysilane or ethyltriacetoxysilane are employed in the second PSA component. As mentioned above, however, the maximum diorganopolysiloxane content and acyloxysilane content in the two components is limited by compatibility considerations and these ingredients must not separate from the PSA matrix to form their own macroscopic phases. It is, of course, recognized that separate phases may exist at a microscopic level.

As will be readily recognized by those skilled in the art, the PSAs of the present invention may be supplied as a solution or dispersion in an inert organic solvent. By inert it is meant that the solvent does not react with any of the other ingredients of the present invention. The particular solvent selected will generally depend upon the PSA employed. Thus, for a non-polar PSA such as a silicone or a butyl rubber, a non-polar solvent such as toluene, hexane, cyclohexane, mineral spirits or xylene would be appropriate. For a polar PSA such as a urethane or acrylonitrile, a polar solvent such as acetone, ethyl acetate, tetrahydrofuran or dimethylformamide might be used. In general, the PSAs contemplated in the present invention are prepared and marketed in such solvent form and are well known in the art.

Any conventional mixing method may be used to mix the ingredients of the above described components. For example, when the PSA is supplied in solution, relatively low shear mixers such as low speed blade mixers or Pfaudlers may be used. When an all-solids PSA is to be used according to the methods of the present invention, a high intensity mixer, such as a Banbury or roll mill, should be used to insure good dispersion of the ingredients. As far as is known, the order of mixing is not critical to the operability of this invention as long as the diorganopolysiloxane and the acyloxysilane are thoroughly dispersed in the respective PSA component.

After the above described first and second components are prepared, said components are contacted in the method of this invention to form a pressure-sensitive adhesive construction. Ordinarily, each component is coated onto a substrate before the contacting step is executed. Thus, this well known method in the art can be practiced using the components disclosed herein by first coating a backer, such as a plastic or metallic film or tape, with the first component of this invention and contacting the resulting composite with the surface of a solid substrate, such as a metal or plastic, which was previously coated with the second component of the present invention. It is also contemplated that a free film of the first and second components of the present invention may be prepared by coating each component onto a release liner as is commonly practiced in the art in certain bonding operations.

To form such coatings on substrates, solvent-based compositions of this invention can be diluted with a sufficient quantity of a good solvent for the respective components in order to provide a desired coating consistency. As described above, such solvents as hexane, heptane, toluene, xylene, mineral spirits or ketones are suitable for this purpose, the exact choice being based on the nature of the PSAs involved, as is commonly practiced in the art. Coatings of such solvent-based first and second components may be applied to substrates by any of the methods commonly practiced in the coating arts. For example, they may be dipped, brushed, flow coated, blade coated or gravure coated onto a substrate. After coating the backer or solid substrate with the PSA composition, solvent is generally removed by evaporation at ambient temperature or by heating, as commonly practiced in the art. Alternatively, 100% solids coatings are also contemplated herein. These may be applied to a substrate by, e.g., a calendaring operation or one of the above mentioned techniques if the viscosity is low enough.

Those skilled in the art will appreciate that the acyloxysilane (IV) reacts with water. It is therefore preferred to store the PSA component containing this ingredient in a dry (e.g., hermetically sealed) condition until the two components are to be contacted by the method of the present invention.

The constructions of the present invention may be used in many of the applications currently being served by the PSAs described above (i.e., ingredient I of the present invention). With the constructions of the present invention, however, the adhesion is improved and, with the passage of time, the adhesive bond formed between the first and second components will generally increase in strength. This permanent set aspect of the present invention is, of course, an advantage in many applications wherein a strong bond, rather than reversibility thereof, is of primary importance. Such applications include bonding of automotive and decorative trim, permanent fastening devices such as picture hooks, contact paper and labels, electronic component assembly, substrate lamination (e.g., metals, paper, plastic, floor tiles, carpeting), and the like.

EXAMPLES

The following examples are presented to further illustrate the compositions and methods of this invention, but are not to be construed as limiting the invention, which is delineated in the appended claims. All parts and percentages in the examples are on a weight basis and all are reported on a solids basis unless indicated to the contrary.

The following materials were used to prepare the constructions of the present invention as well as comparative constructions:

FLUID A is a hydroxyl endblocked polydimethylsiloxane having a viscosity of about 40 cS at 25° C.

FLUID B consists essentially of a hydroxyl endblocked polydimethylsiloxane having an approximate number average molecular weight of 40,000.

FLUID C is a 32% toluene solution of a hydroxyl endblocked dimethylpolysiloxane gum, said gum having a viscosity of about 200,000 Poise at 25° C.

MTO is a methyl trioximosilane having the structure

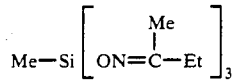

wherein Me hereinafter denotes a methyl radical and Et represents an ethyl radical.

DBTDA is dibutyltin diacetate.

EXAMPLES 1-6

An acrylic pressure-sensitive adhesive (PSA) solution, 76 RES 9105, was modified to form the constructions of the present invention. 76 RES 9105 (Unocal Chemicals Division, Schamburg, IL) is described as a high performance "self-crosslinking" pressure sensitive adhesive which is a 45% solids solution of an acrylic resin polymer in an oxygenated hydrocarbon solvent blend. A first component was prepared by thoroughly mixing the indicated amount of FLUID A with this PSA (see Table 1). A second component was prepared by thoroughly mixing phenyltriacetoxysilane with another portion of the PSA solution, also indicated in Table 1. Each of these components was then applied to 5 mil aluminum foil, dried to form a 2 mil-thick film thereon and the coated foil was cut into 1 inch-wide strips. The foil strips bearing the first and second PSA adhesive films were pressed together using a 10 pound steel roller at room temperature to form a lap joint having a one inch overlap (i.e., a total of one square inch contact surface). The same procedure was followed in the preparation of (Comparative) Example 1, which served as a control and contained no additives in either PSA layer. The lap joints were aged at room temperature for various periods and then tested (at room temperature using a pull rate of ½ inch/minute) to determine shear adhesive strength. Results are presented in Table 1, wherein the shear strength is reported in pounds per square inch (psi).

TABLE 1

|  | Comparative Ex. 1 | Ex. 2 | Ex. 3 | Ex. 4 | Ex. 5 | Ex. 6 |
|---|---|---|---|---|---|---|
| % FLUID A in first component (solids basis) | — | 20 | 20 | 10 | 1.0 | 1.0 |
| % phenyltriacetoxysilane in second component (solids basis) | — | 10 | 0.1 | 1.0 | 10 | 0.1 |
| Shear Adhesion (psi) After: | | | | | | |
| 1 hour | 66 | 74 | 57 | 79 | 81* | 86* |
| 1 day | 60 | 92 | 81 | 81 | 92* | 87 |
| 2 days | 63 | 84* | 86* | 94* | 88* | 89* |
| 7 days | 64 | 88* | 89* | 86* | 93* | 88* |
| 28 days | 69 | 87* | 84* | 89* | 83* | 91* |

*Aluminum foil tore; actual shear strength greater than indicated.

EXAMPLES 7-11

The 76 RES 9105 acrylic pressure-sensitive adhesive solution was modified as described above to form the PSA constructions shown in Table 2. These constructions were tested as described in Examples 1-6, with the exception that 5 mil thick stainless steel foil was use instead of the aluminum foil.

TABLE 2

|  | (Comparative) Ex. 7 | (Comp.) Ex. 8 | Ex. 9 | Ex. 10 | Ex. 11 |
|---|---|---|---|---|---|
| % FLUID A in first component (solids basis) | 20 | — | — | — | 2.0 |
| % FLUID B in first component (solids basis) | — | — | 2.0 | 2.0 | — |
| % phenyltriacetoxysilane in first component (solids basis) | — | 10 | — | — | — |
| % FLUID A in second component (solids basis) | 20 | — | — | — | — |
| % phenyltriacetoxysilane in second component (solids basis) | — | 10 | 0.5 | — | — |
| % ethyltriacetoxysilane in second component (solids basis) | — | — | 0.1 | 0.5 | 0.5 |
| Shear Adhesion (psi) After: | | | | | |
| 1 hour | 23 | 40 | 144 | 102 | 91 |
| 1 day | 35 | 44 | 204 | 241 | 73 |
| 2 days | 45 | 39 | 200 | 252 | 171 |
| 7 days | 33 | 42 | 218 | 249 | 249 |
| 28 days | 24 | 46 | — | — | — |

It can be seen from Table 2 that modifying both components only with either FLUID A or the phenyltriacetoxysilane (Comparative examples 7 and 8, respectively) actually reduces shear adhesion versus the control PSA (Comparative Example 1).

EXAMPLES 12-17

A styrene-butadiene rubber based PSA solution, DURO-TAK 36-6045, was modified and tested on 5 mil thick steel foil, according to the procedures of Examples 7-11, as shown in Table 3. DURO-TAK 36-6045

(National Starch and Chemical Corp., Bridgewater, N.J.) is described as a 48% solids solution in toluene, heptane and isopropyl alcohol having a viscosity of about 5,500 cP at 25° C. Again, a control construction (Comparative Example 17) was prepared to illustrate the unmodified styrene-butadiene PSA. The unmodified PSA solution was applied to 5 mil thick aluminum foil and a one inch overlap was used in testing this control construction.

TABLE 3

|  | Ex. 12 | Ex. 13 | Ex. 14 | Ex. 15 | Ex. 16 | (Comp.) Ex. 17 |
|---|---|---|---|---|---|---|
| % FLUID A in first component (solids basis) | 2.0 | 2.0 | — | — | — | — |
| % FLUID B in first component (solids basis) | — | — | 2.0 | 2.0 | — | — |
| % FLUID C silane in first component (solids basis) | — | — | — | — | 2.0 | — |
| % phenyltriacetoxy-silane in second component (solids basis) | — | 0.5 | — | 0.5 | 0.5 | — |
| % ethyltriacetoxy-silane in second component (solids basis) | 0.5 | — | 0.5 | — | — | — |
| Shear Adhesion (psi) After: | | | | | | |
| 1 hour | 222 | 227 | 208 | 141 | 252 | 7 |
| 1 day | 220 | 252 | 215 | 200 | 221 | 10 |
| 2 days | 246 | 200 | 236 | 193 | 191 | 11 |
| 7 days | 239 | 199 | 207 | 161 | 223 | 9 |
| 28 days | — | — | — | — | — | 9 |

EXAMPLE 18

A first component of the DURO-TAK 36-6045 styrene-butadiene rubber PSA was modified with 5.0 percent of MTO and a second component of this PSA was modified with a mixture of 9.0 percent of FLUID A and 1.0 percent of DBTDA according to the above procedures. Shear adhesion testing results, using the 5 mil thick aluminum foil as the substrate and a one inch overlap, are presented in Table 5.

TABLE 5

| Shear Adhesion (psi) After: | |
|---|---|
| 1 hour | 17 |
| 1 day | 18 |
| 2 days | 20 |
| 7 days | 22 |
| 28 days | 17 |

It is known in the silicone sealants art that compositions containing the above modification ingredients (i.e., the MTO, FLUID A and DBTDA) would cure at room temperature. Nevertheless, the modification of the above PSA with these materials did not improve the shear strength as much as did the modifications according to the present invention.

Similar attempts to modify an acrylic PSA, with MTO in the first component and the FLUID A and DBTDA in the second component, were also ineffective.

EXAMPLE 19

The above described styrene-butadiene rubber PSA was modified by incorporating 2.0% of FLUID A in the first component and 0.5% of ethyltriacetoxysilane in the second component, as described in Example 12 and the modified PSA components were coated onto 5 mil thick stainless steel foil, as before. The effect of relative humidity on adhesion performance was evaluated by exposing the coated steel foils to (a) 100% relative humidity (R.H.) at 60° C.; (b) essentially 0% R.H. at room temperature; and (c) ambient conditions. After storage for the times indicated in Table 6, the components were pressed together for one hour and shear tested using a one inch overlap.

TABLE 6

| Storage Condition | Storage Time | Shear Strength (psi) |
|---|---|---|
| 100% R.H. | 1 day | 169 |
| " | 7 days | 136 |
| " | 14 days | 139 |
| " | 28 days | 93 |
| 0% R.H. | 1 day | 227 |
| " | 7 days | 258 |
| " | 14 days | 244 |
| " | 28 days | 285 |
| Ambient | 1 hour | 222 |

It is seen from Table 6 that exposure of the coated PSA foils of the present invention to high humidity reduces ultimate shear adhesion, but the bond strength is still quite high. Furthermore, the coated foils retained their tack irrespective of storage condition.

We claim:
1. A method for forming a crosslinkable pressure-sensitive adhesive construction comprising: contacting a first component comprising
   (I) a pressure-sensitive adhesive; and
   (II) a diorganopolysiloxane fluid having at least two hydroxyl groups per molecule attached to the silicon atoms thereof, with a second component comprising

(III) a further portion of said pressure-sensitive adhesive; and
(IV) an acyloxysilane having the average formula

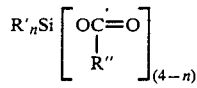

wherein R' is a monovalent hydrocarbyl group selected from the group consisting of a phenyl group and alkyl radicals having 1 to 6 carbon atoms, R" is an alkyl radical having 1 to 7 carbon atoms and n is 1 to 3.

2. The method of claim 1, wherein said pressure-sensitive adhesive is selected from those based on silicone, acrylic, styrene-butadiene, acrylonitrile-butadiene, polyisobutylene, isoprene, isoprene-isobutylene, chloroprene, polyvinylether, chlorinated or polyurethane rubber.

3. The method of claim 1, wherein said diorganopolysiloxane (II) is a linear polymer having the formula $$(HO)R_2SiO(R_2SiO)_xSiR_2(OH)$$

wherein R is selected from the group consisting of monovalent hydrocarbyl radicals and monovalent halogenated hydrocarbyl radicals and x is 2 to about 5,000.

4. The method of claim 3, wherein R is selected from the group consisting of methyl, phenyl and trifluoropropyl radicals.

5. The method of claim 4, wherein R' of said acyloxysilane (IV) is selected from the group consisting of methyl, ethyl and phenyl radicals.

6. The method of claim 5, wherein R" of said acyloxysilane (IV) is a methyl radical.

7. The method of claim 6, wherein n of said acyloxysilane (IV) is 1.

8. The method of claim 7, wherein R of said diorganopolysiloxane (II) is a methyl radical and x of said diorganopolysiloxane (II) is 2 to 500.

9. The method of claim 7, wherein said pressure-sensitive adhesive is based on a rubber selected from the group consisting of acrylic and styrene-butadiene rubbers.

* * * * *